United States Patent [19]
Nielsen et al.

[11] Patent Number: 6,019,652
[45] Date of Patent: Feb. 1, 2000

[54] BUOYANCY ADJUSTMENT

[75] Inventors: Einar Nielsen, Gjettum, Norway; Thomas Clive Snook, Oegstgeest, Netherlands

[73] Assignee: Petroleum Geo-Services AS, Lysaker, Norway

[21] Appl. No.: 08/859,233

[22] Filed: May 20, 1997

[30] Foreign Application Priority Data

May 31, 1996 [NO] Norway .................................. 962270

[51] Int. Cl.[7] .............................. B63G 8/14; F16L 1/12; G01V 1/38; B63B 22/00
[52] U.S. Cl. .............................. 441/133; 367/16; 367/18; 405/172; 114/245
[58] Field of Search ...................... 405/158, 172, 405/171; 441/133; 367/16–18, 191, 188; 114/245

[56] References Cited

U.S. PATENT DOCUMENTS

| | | |
|---|---|---|
| 3,375,800 | 4/1968 | Cole et al. .............................. 114/245 |
| 3,440,992 | 4/1969 | Chance .................................... 114/245 |
| 3,605,674 | 9/1971 | Weese .................................. 367/17 X |
| 3,638,601 | 2/1972 | Hale et al. .............................. 114/245 |
| 3,791,480 | 2/1974 | Clearwaters .............................. 181/0.5 |
| 4,086,561 | 4/1978 | Wooddy .............................. 405/171 X |
| 4,631,711 | 12/1986 | Fowler . |
| 4,711,194 | 12/1987 | Fowler . |
| 4,725,995 | 2/1988 | Fowler . |
| 4,879,719 | 11/1989 | Dumestre, III . |
| 4,953,146 | 8/1990 | McMurry .............................. 405/171 X |
| 5,278,804 | 1/1994 | Halvorsen .............................. 405/171 X |
| 5,365,491 | 11/1994 | Sullivan et al. ......................... 367/16 X |
| 5,507,243 | 4/1996 | Williams, Jr. et al. . |
| 5,529,011 | 6/1996 | Williams, Jr. . |
| 5,619,474 | 4/1997 | Kuche . |

*Primary Examiner*—Dennis L. Taylor
*Attorney, Agent, or Firm*—Gordon T. Arnold

[57] ABSTRACT

Device for the adjustment of buoyancy of a seismic cable comprising a main part (1) adapted to firm, integrated mounting into a chosen point in the length of the cable, the main part (1) comprising fastening means (3,4) for one or more weight or buoyancy elements (2) and one or more exchangeable weight or buoyancy elements (2) adapted to being mounted into the main part (1).

51 Claims, 2 Drawing Sheets

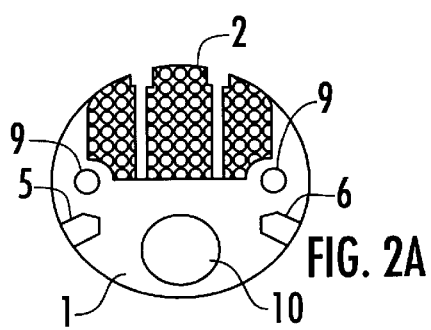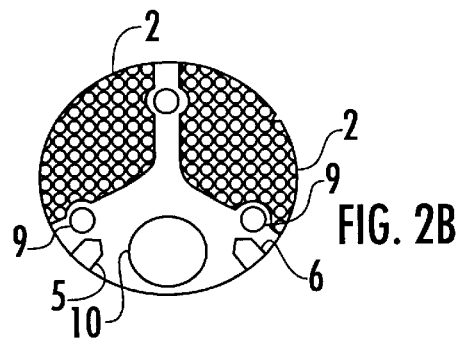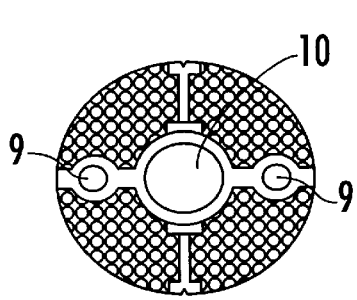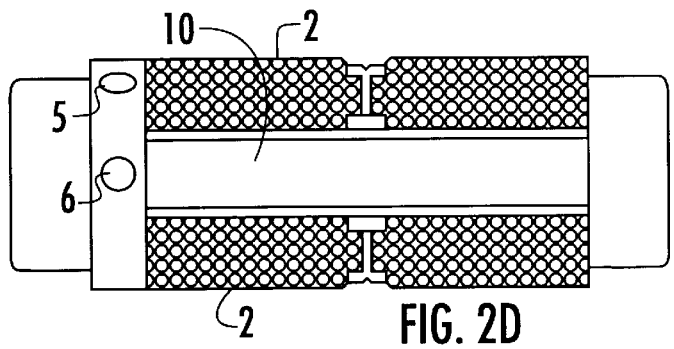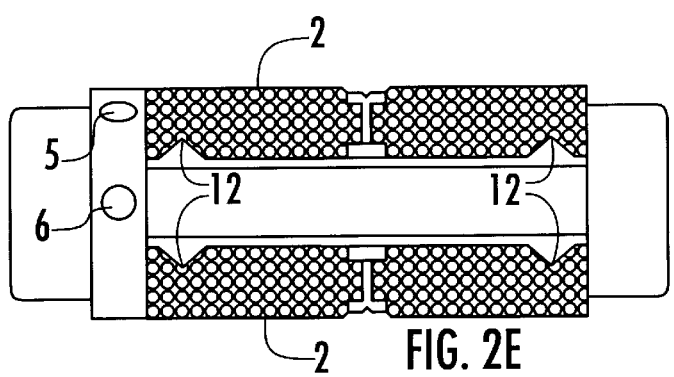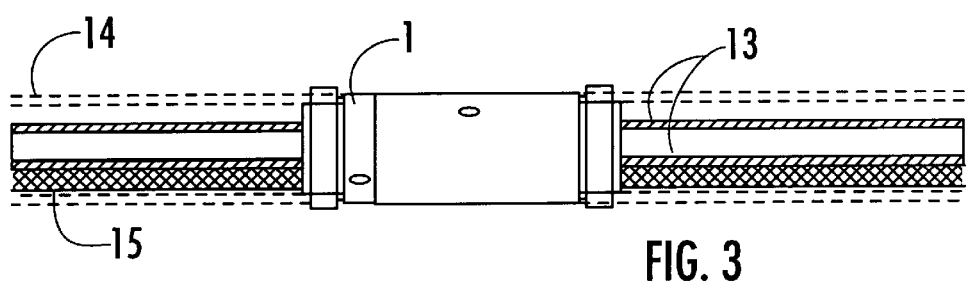

BUOYANCY ADJUSTMENT

This application claims priority to Norwegian patent application number 96.2270 filed May 31, 1996.

This invention relates to a device for adjusting the buoyancy of a seismic cable, the device comprising a main part adapted for firm, integrated mounting at a chosen point in the longitudinal direction of the cable.

In seismic studies at sea, cables are used and being towed after a vessel. The cables comprise different kinds of sensors for the measuring of acoustic waves being reflected from geological formations beneath the bottom of the sea. The acoustic waves have been generated from one or more sources by the vessel or vessels. Typically, the sensors will be hydrophones, or possibly geophones, located along the longitudinal direction of the seismic cables in order to receive different parts of the reflected waves. To provide accurate results from the measurements it is important that the positions of the sensors are well defined, with a given depth and position in relation to the seismic source. It is therefore important that the cables have a linear and smooth progress through the water, and that the whole cable is kept at the same depth. It is also usual to fill the cable with a liquid, e.g. oil or kerosene, which will behave like a buoyant medium, so that the cable is provided with a net weight comparable to that of the surrounding water, and is kept with a stable shape at different depths.

In order to maintain the cable at a chosen depth it must be balanced in relation to its weight and buoyancy so that it is as neutral as possible in relation to the surrounding water. This may, however, be problematic, since the buoyancy of the cable will vary with the salt content of the water. The buoyancy therefore must be regulated in accordance to the environment. As the buoyancy of the cable in relation to the surrounding water can vary during an operation, it must be possible to change the buoyancy in a simple manner. This has previously been done by fastenings different types of weights to the cable. The weights have been attached to the outside of the cable using tape. This solution has, however, major disadvantages. The tape often dissolves in sea water, and the weights fall off. Also the fastening of the weights with tape is time consuming, and it is awkward to take the weights off and move the weights to another position along the cable, especially since these operations often must be performed at sea. Also, the necessary quality of tape is expensive, and can not be used more than once. Another disadvantage related to this solution is that the tape and the weights generate noise and vibrations when the cable is towed through the water, which may disturb the sensors in the cable.

In Norwegian patent no. 179.927 (U.S. patent application No. 08/438,632, international patent application no. PCT/NO95/00076) a depth controller is described comprising a main part being mounted at a chosen point along the length of the cable. The depth controller does comprise a tank for adjusting the buoyancy, but this is primarily intended only to adjust the buoyancy of the depth controller. The purpose of the depth controller is otherwise to adjust its own depth, and the cables depth by use of the wings. The depth controller is not adapted to adjustments of the buoyancy during use. The present invention may, on the contrary, function as an addition in, or by, the depth controller. This may provide a possibility for changing the buoyancy of the cable in order to adapt the system to the local conditions in a simple way.

In Norwegian patent application 90.5497 (U.S. Pat. No. 5,278,804) a solution is described in which the weights are fastened around the cable using simple locking mechanisms so that they are clamped to the outside of the cable. This provides a simpler way to fasten the weights, but has the disadvantage that they extend outside the diameter of the cable. Thus, this solution will also generate noise when the cables are towed, and in addition, increase the towing resistance of the cable. The present invention is aimed to solve these problems.

The present invention is based upon the known technique relating to the positioning of blocks in the longitudinal direction of the cable. These are used to suppress vibrations propagating along the cable in the liquid it contains, dampen the movements in this liquid, keep electrical conductors and wires protected and separated, as well as to keep the shape of the cable stable. The blocks are preferably located at even distances along the whole of the cables length. The present invention is also related to devices which may function as such blocks. The invention is related to a buoyancy adjustment device for the adjustment of buoyancy in a seismic cable, the device comprising a main part adapted for firm, integrated mounting at a chosen point in the longitudinal direction of the cable, wherein the main part comprises fastening means for at least one weight or buoyancy element, and at least one exchangeable weight or buoyancy element for removable mounting in the main part.

This way a possibility is obtained to regulate the buoyancy of a seismic cable in a simple manner using units which will be installed in the cable anyway.

The invention will be described below by way of example and with reference to the accompanying drawings.

FIGS. 2A–2E show sections of different alternative embodiments of the invention.

FIG. 3 shows a device according to the invention mounted in a cable.

Figure 1A:
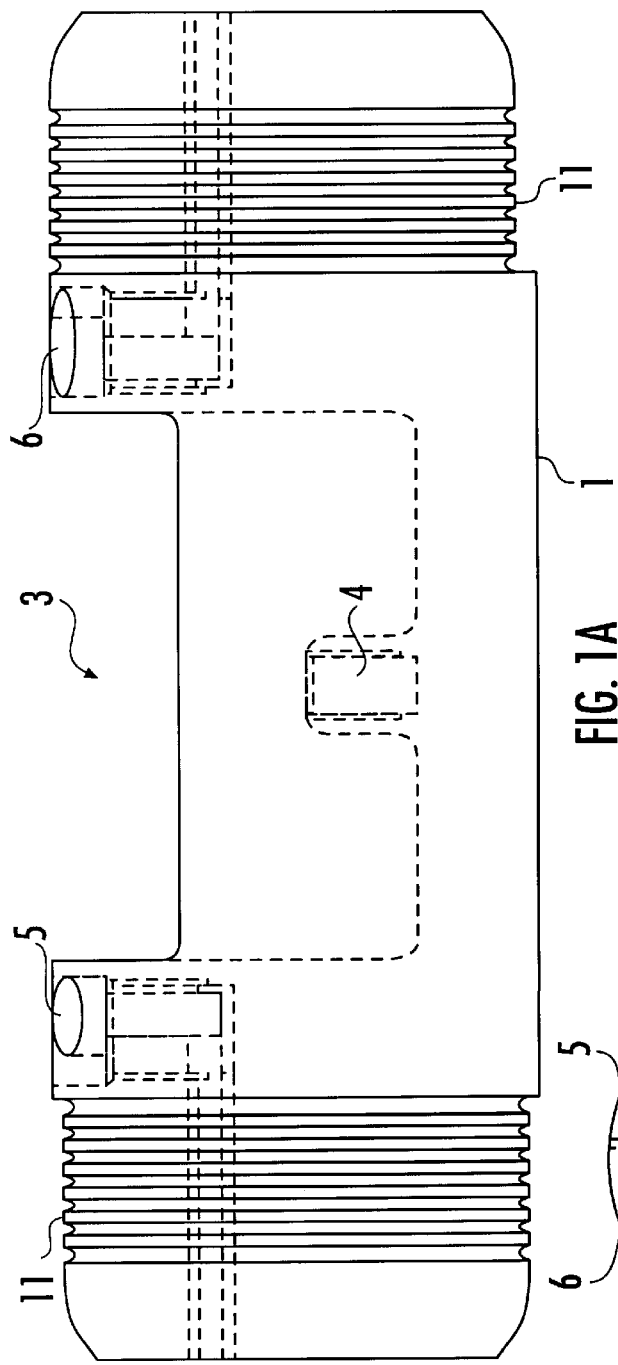
FIGS. 1A and 1B show a main part of a device according to the invention as seen from two sides.
Figure 1B:
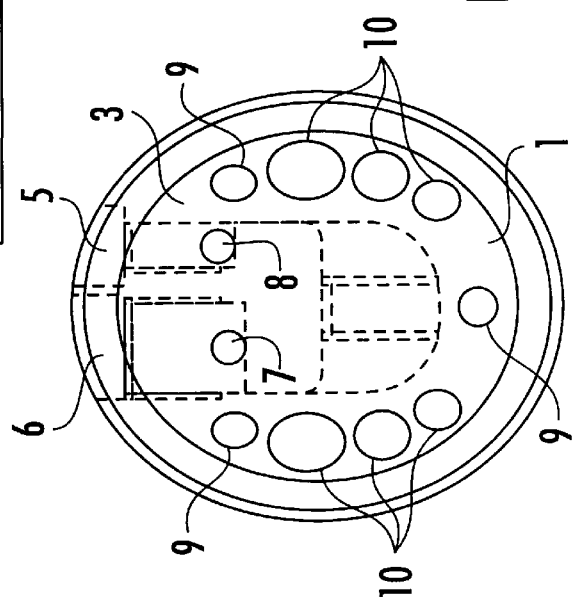

FIGS. 1A and 1B show the main part of the device with a room 3 for a weight or buoyancy element, in which FIG. 1A shows the main part as seen from the side and FIG. 1B shows it as seen from one end. The main part 1 is preferably made from plastic, or a similar material, with a relatively neutral buoyancy in water, and will also comprise means 4 for the fastening of weight elements to the main part, passages 9 for wires extending along the seismic cable and similar passages 10 for electric conductors. The main part may in addition comprise valves 5,6 with relating channels 7,8 provided for the emptying and filling of the cable. In some cases it may be preferrable to let the liquid move through a suitable channel (not shown), possibly controlled by valves located in the channel, so that all the liquid may be filled in or poured out in the same position in the cable, preferably at the ends. The valves may be of any known type, depending on the use of the cable and other characteristics, as well as the characteristics of the liquid.

The embodiment shown in FIGS. 1A and 1B is adapted to a cable comprising three wires running in the longitudinal direction of the cable through the channels 9. This number will normally vary from one to five, but more may also be possible. Correspondingly the number of channels for electric conductors may vary depending on the cable at hand.

Fastening the main part to the cable may be performed in many different, known ways and will not be discussed any further here. Preferably, the fastening mechanism and the main part have the same cross sectional dimensions, so that noise generated from unevenness along the cable is avoided.

FIGS. 2A–2E show sections of different other embodiments of the invention. FIG. 2A shows a cross section of another embodiment comprising one weight or buoyancy element 2. In this case, the main part is adapted to a cable with two wires and one bundle of conductors.

FIG. 2B shows a variant with two weight elements. This will give increased flexibility in varying the buoyancy of the seismic cable, since weight elements 2 of different kinds may be located at approximately the same position in the cable and together provide a buoyancy between what may be obtained with one of the materials. This version also shows a combination adapted to three wires and one bundle of conductors.

In FIG. 2C a cross section of another version is shown comprising two weight elements 2 adapted to two wires and one bundle of conductors. In this case, there will also be a possibility of using one centrally positioned wire and two conductor bundles. The embodiment of FIG. 2C comprises weight or buoyancy elements occupying a substantial part of the cross section of the device. This provides great freedom in the varying the buoyancy of the cable, as it provides a large range of variation of the weight of each element 2. If there is a need for a positive buoyancy in the elements 2 this is an advantageous solution as the volumes of the elements are relatively large. FIG. 2D shows a partial section in the longitudinal direction of the same embodiment in which the position of the valves 5,6 is indicated.

Essentially the same embodiment is shown in FIG. 2E as in FIG. 2D, but the main part is provided with taps 12 engaging into corresponding recesses in the weight or buoyancy elements 2, so that they are able to take up some of the strain in the device. This solution may, of course, also be employed in other embodiments of the invention.

The weight or buoyancy elements 2 may be made from different types of materials depending on the situation, from heavy materials such as lead or tungsten to light materials such as plastic or gas containers. Variants with pieces of metal cast into plastic are also possible, and may provide a possibility to obtain a certain weight.

In all of the embodiments shown here, the weight or buoyancy element 2 is fastened to the main part using screws. Other solutions may, of course, be conceived, for example, spring devices.

FIG. 3 shows another embodiment of the invention mounted to a cable. The surface of the device is essentially in line with the surface 14 of the cable. The Figure. shows a cable with two wires 13 and one bundle of conductors 15.

The device according to the invention will normally be positioned at intervals along the cable, with an intermediate distance of, for example, 12.5 meters in a cable section of 75 meters. The total seismic cable will comprise a number of such sections coupled together.

Other embodiments than those illustrated in the drawings may, of course, be conceived. For example, in one embodiment the main part of the device according to the invention is split into two or more parts and may be mounted in an existing seismic cable by joining the parts together around the longitudinally extending wires and electric conductors in the cable. The weight or buoyancy element may be covered by a lid adapted for waterproof enclosure of the elements, and in such cases the room 3 for the elements may be empty, or possibly, the resulting room may in itself function as a weight or buoyancy element, depending on it containing water or air.

The main part of the device may be made from plastic, or possibly plastic with an outer protecting layer of another material. Metal may be used in some situations, depending on the desired weight.

According to one embodiment of the present invention, a buoyancy adjustment device for the adjustment of buoyancy in a seismic cable is provided. The device comprises a main part (1) adapted for firm, integrated mounting at a chosen point in the longitudinal direction of the cable, characterized in that the main part (1) comprises fastening means (3,4) for at least one weight or buoyancy element (2), and at least one exchangeable weight or buoyancy element for removable mounting in the main part (1).

A further embodiment is characterized in that the device has a cylindrical outer shape with essentially the same diameter as the seismic cable.

A further embodiment of the present invention is characterized in that the main part comprises through holes (10) for passing through electric cables (15) or corresponding devices comprised by the seismic cable.

A further embodiment of the present invention is characterized in that the main part comprises channels for controlled passage of fluids comprised in the seismic cable through the main part (1), possibly controlled by valves or similar devices.

A further embodiment of the invention is characterized in that the device comprises means (5,6) for draining or filling of fluids out of, or into, the seismic cable.

A further embodiment of the invention is characterized in that said fluids comprise a buoyant medium, for example, kerosene.

A further embodiment of the invention is characterized in that at least one weight or buoyancy element (2) comprises a heavy metal, for example, lead or tungsten.

A further embodiment of the invention is characterized in that at least one weight or buoyancy element (2) comprises a material with a positive buoyancy.

A further embodiment of the invention is characterized in that at least one weight or buoyancy element (2) comprises metal bodies molded into a plastic material.

A further embodiment of the invention is characterized in that the device also comprises a cover for water tight enclosure of the exchangeable weight or buoyancy elements (2).

We claim:

1. A buoyancy adjustment device for the adjustment of buoyancy in a seismic cable, said device comprising:
   a main part;
   at least one fastening means;
   wherein said fastening means is adapted and arranged for integral mounting of said main part to a cable; and
   at least one buoyancy element adapted and arranged for removable mounting to said main part.

2. The buoyancy adjustment device as in claim 1, wherein said main part comprises an approximately cylindrical shape having a diameter essentially comparable to the diameter of the cable.

3. The buoyancy adjustment device of claim 2, wherein said main part further comprises holes adapted and arranged for the passing of communication devices of the seismic cable.

4. The buoyancy adjustment device of claim 3, wherein said communication devices further comprise electric cables.

5. The buoyancy adjustment device of claim 4, wherein said main part further comprises controlled fluid passing channels.

6. The buoyancy adjustment device of claim 5, wherein said controlled fluid passing channels further comprise fluid limiting devices.

7. The buoyancy adjustment device of claim 6, wherein said fluid limiting devices comprise valves.

8. The buoyancy adjustment device of claim 1, further comprising a means for draining fluids from the seismic cables.

9. The buoyancy adjustment device of claim 8, wherein said main part further comprises holes adapted and arranged for the passing of communication devices of the seismic cable.

10. The buoyancy adjustment device of claim 9, wherein said main part further comprises controlled fluid passing channels.

11. The buoyancy adjustment device of claim 10, wherein said controlled fluid passing channels further comprise fluid limiting devices.

12. The buoyancy adjustment device of claim 11, wherein said fluid limiting devices comprise valves.

13. The buoyancy adjustment device of claim 12, wherein said main part further comprises controlled fluid passing channels.

14. The buoyancy adjustment device of claim 13, wherein said controlled fluid passing channels further comprise fluid limiting devices.

15. The buoyancy adjustment device of claim 14, wherein said fluid limiting devices comprise valves.

16. The buoyancy adjustment device of claim 8, wherein said fluids comprise a buoyant medium.

17. The buoyancy adjustment device of claim 16, wherein said buoyant medium comprises kerosene.

18. The buoyancy adjustment device of claim 1, further comprising a means for filling fluids into the seismic cable.

19. The buoyancy adjustment device of claim 18, wherein said fluids comprise a buoyant medium.

20. The buoyancy adjustment device of claim 19, wherein said buoyant medium comprises kerosene.

21. The buoyancy adjustment device of claim 1, wherein said buoyancy element comprises a weight.

22. The buoyancy adjustment device of claim 21, wherein said weight comprises a heavy metal.

23. The buoyancy adjustment device of claim 22, wherein said heavy metal comprises lead.

24. The buoyancy adjustment device of claim 22, wherein said heavy metal comprises tungsten.

25. The buoyancy adjustment device of claim 1, wherein said buoyancy element comprises a material having positive buoyancy.

26. The buoyancy adjustment device of claim 25, wherein said buoyancy element comprises metal bodies molded into a plastic material.

27. The buoyancy adjustment device of claim 1, further comprising a cover adapted and arranged for watertight enclosure of said buoyant element.

28. The buoyancy adjustment device of claim 27, wherein said buoyancy element comprises a material further comprising positive buoyancy.

29. The buoyancy adjustment device of claim 28, wherein said buoyancy element comprises metal bodies molded into a plastic material.

30. A device for the adjustment of buoyancy of a seismic cable, said device comprising:
a means for mounting a removable buoyancy element to a main part which is integrally fastened to a cable;
a means for testing the buoyancy of the seismic cable; and
a means for adjusting the buoyancy, dependent upon the means for testing.

31. The device of claim 30, wherein said means for testing comprises a means for submerging the cable and observing the buoyancy of the seismic cable.

32. The device for the adjustment of buoyancy of a seismic cable in a liquid, said device comprising:
a means for allowing fluid to pass through said device which is attached to the seismic cable;
a means for testing the buoyancy of the seismic cable; and
a means for adjusting the buoyancy, dependant upon the means for testing, wherein said means for adjusting adjusts the amount of fluid allowed to pass through said device.

33. The device of claim 32, wherein said means for testing comprises a means for submerging the cable and observing the buoyancy of the seismic cable.

34. The device of claim 33, wherein the fluid is more buoyant than the liquid in which the cable is submerged.

35. The device of claim 33, wherein the fluid is less buoyant than the liquid in which the cable is submerged.

36. The device of claim 32, wherein the fluid comprises oil.

37. The device of claim 32, wherein the fluid comprises kerosene.

38. A device for the adjustment of buoyancy of a seismic cable, said device comprising:
an approximately cylindrical main part further comprising:
a hollowed section;
a channel; and
a passage;
wherein said channel spans at least a portion of said main part;
wherein said passage spans at least a portion of said main part;
a fastener located near at least one end of said approximately cylindrical main part; and
a buoyancy element located within said hollowed section;
wherein the shape of said buoyancy element substantially corresponds to the shape of said hollowed section.

39. The device of claim 38 wherein said approximately cylindrical main part has a diameter approximately equal to the diameter of the seismic cable.

40. The device of claim 39 wherein said channel further comprises an essentially hollow approximately tubular tunnel.

41. The device of claim 40 wherein said passage further comprises an essentially hollow approximately tubular tunnel.

42. The device of claim 41 wherein the diameter of said passage approximates the diameter of the electrical conductors in the seismic cable.

43. The device of claim 38 further comprising a valve.

44. The device of claim 38 further comprising a cover.

45. The device of claimed 44 wherein said cover comprises an approximately cylindrical enclosure.

46. The device of claim 45 wherein said approximately cylindrical enclosure comprises at least two sections in essentially watertight communication.

47. The device of claim 38 wherein said buoyancy element comprises an essentially solid unitary formation.

48. The device of claim 38 wherein said buoyancy element further comprises an inner mold and an outer mold.

49. The device of claim 48 wherein said inner mold comprises a metal.

50. The device of claim 49 wherein said outer mold comprises plastic.

51. The device of claim 38 wherein said buoyancy element is essentially hollow.

* * * * *